D. RICE & G. K. CHILDS.
Stretcher and Wheeled-Frame.
No. 202,868. Patented April 23, 1878.
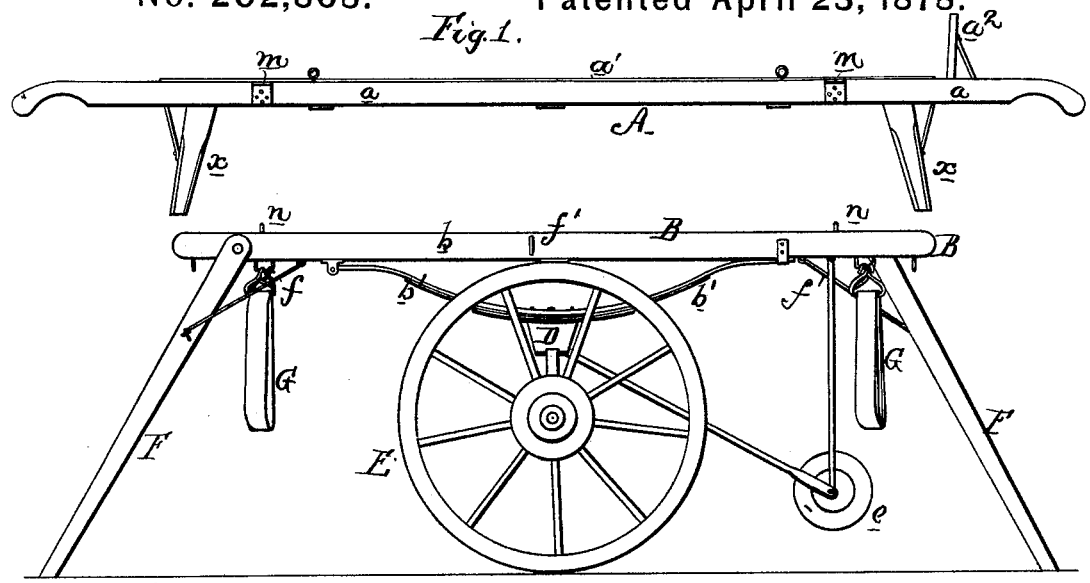
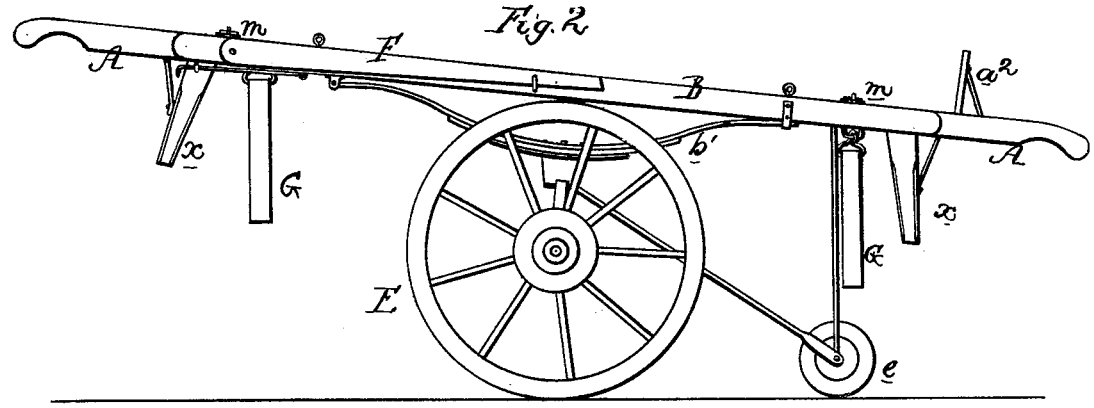
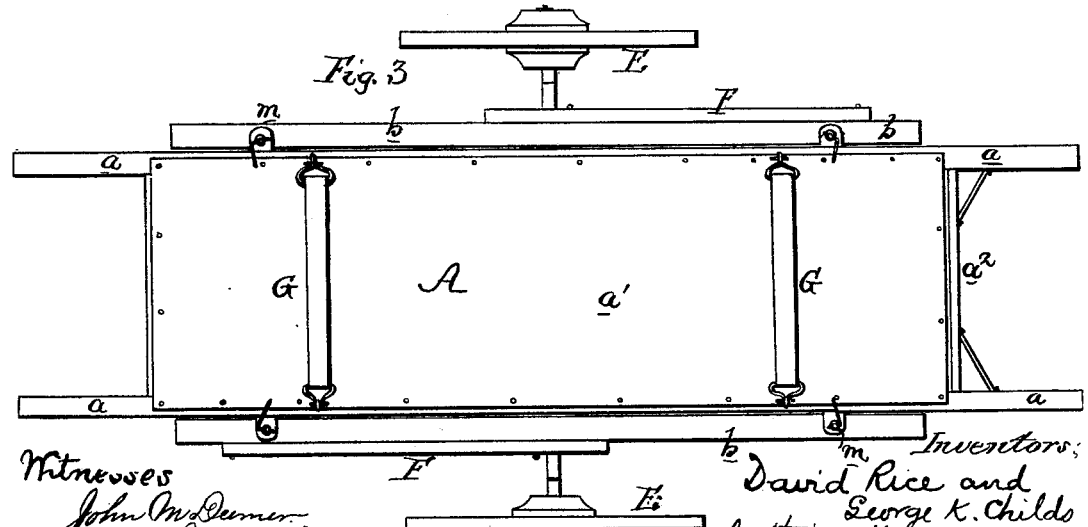

UNITED STATES PATENT OFFICE.

DAVID RICE AND GEORGE K. CHILDS, OF PHILADELPHIA, PENNSYLVANIA.

IMPROVEMENT IN STRETCHERS AND WHEELED FRAMES.

Specification forming part of Letters Patent No. 202,868, dated April 23, 1878; application filed August 9, 1877.

*To all whom it may concern:*

Be it known that we, DAVID RICE and GEORGE K. CHILDS, of Philadelphia, Pennsylvania, have invented certain Improvements in Stretchers and Wheeled Frames, of which the following is a specification:

The object of our invention is to combine a stretcher with a wheeled frame or truck in such a manner that it will afford facilities for the easy and ready carrying of the sick and wounded. This object we attain in the manner which we will now proceed to describe, reference being had to the accompanying drawing, in which—

Figure 1 is a side view of the stretcher and the wheeled frame detached from each other; Fig. 2, a view of the two parts connected together; and Fig. 3 a plan view.

The stretcher A is composed of two longitudinal side bars, $a\ a$, with handles at each end, and suitable cross-bars, and a sheet, $a^1$, of flexible material, head-piece $a^2$, and legs $x\ x$, for use when the stretcher is to be placed on the ground.

B is a frame, composed of two longitudinal side bars, $b\ b$, connected together by any suitable number of cross-bars, and having springs $b'\ b'$, which are connected to the axle D, provided with wheels E. A leading-wheel, $e$, is carried by braces secured to the fore part of the frame, as in ordinary hand-trucks.

The stretcher A is placed between the side bars $b\ b$, and has perforated lugs $m\ m$ for fitting over staples on the side bars $b\ b$ on the frame B, to which the lugs are secured by suitable pins or hooks, as shown in Figs. 2 and 3.

To each of the bars $b$, at opposite corners of the wheeled frame, Fig. 3, is hinged a leg, F, which can either be folded up against the side bars $b\ b$ on the retaining-hooks $f'$, or be placed in the position shown in Fig. 1, steadying-braces $f\ f$, in the latter case, being hooked to staples on the said legs.

The patient is placed on the stretcher while the latter is on the ground, and straps G, connected to suitable catches on the opposite sides of the stretcher-frame, are adjusted over the patient's body. The stretcher, with the patient, is then placed on the wheeled frame B, which is held in a horizontal position by the steadying-legs F, and after the stretcher has been secured the legs F are folded up against the side bars, as shown in Fig. 2, and the patient can then be rapidly wheeled to his destination without discomfort.

We are aware that a stretcher has been combined with detachable wheels and axle, but without any frame, so that these wheels and axles are of no use when the stretcher is detached, whereas in our invention the wheeled frame B, having the longitudinal side bars and cross-pieces, is available as a truck for a variety of uses after the stretcher has been removed.

We claim as our invention—

The combination of the detachable stretcher A with a wheeled frame, B, having longitudinal side bars $b\ b$ and connecting cross-pieces, on which the said stretcher is adapted to be placed, all substantially as described.

In testimony whereof we have signed our names to this specification in the presence of two subscribing witnesses.

DAVID RICE.
GEO. K. CHILDS.

Witnesses:
HERMANN MOESSNER,
HUBERT HOWSON.